United States Patent [19]

Bragas

[11] 4,148,077
[45] Apr. 3, 1979

[54] METHOD OF PLAYING BACK VIDEO RECORDS THROUGH TELEVISION RECEIVER OPERATING AT A DIFFERENT LINE STANDARD

[75] Inventor: Peter Bragas, Hildesheim-Itzum, Fed. Rep. of Germany

[73] Assignee: Blaupunkt-Werke GmbH, Hildesheim, Fed. Rep. of Germany

[21] Appl. No.: 822,521

[22] Filed: Aug. 8, 1977

[30] Foreign Application Priority Data

Aug. 14, 1976 [DE] Fed. Rep. of Germany ....... 2636772

[51] Int. Cl.² .......................... H04N 5/02; G11B 19/28
[52] U.S. Cl. ...................... 360/10; 358/140; 360/35; 360/73
[58] Field of Search .......................... 360/10, 73, 8-9, 360/35-37, 27; 358/140

[56] References Cited

U.S. PATENT DOCUMENTS 3,676,585  7/1972  Kaneko et al. ..................... 358/140
3,959,819  5/1976  Kubo ..................................... 360/10

Primary Examiner—Alfred H. Eddleman
Attorney, Agent, or Firm—Flynn & Frishauf

[57] ABSTRACT

A video disk recording made in accordance with U.S. television standards, namely a line scanning frequency of 15,734 HZ and a field scanning frequency of 30 HZ is played back through a pick-up feeding a television receiver operating at the European standard line scanning frequency of 15,625 HZ provided with a switch that has changed over the vertical scanning frequency to the 30 HZ U.S. standard field scanning frequency. In order for the playback system to work with the European line scanning frequency, the record drive is timed to operate at the proportionately low speed and the speed is held to the timing pulses produced by an oscillator by feeding back the picked up synchronizing signals and comparing them with the oscillator timing pulses in a phase detector that controls the speed adjustment of the playback motor.

2 Claims, 1 Drawing Figure

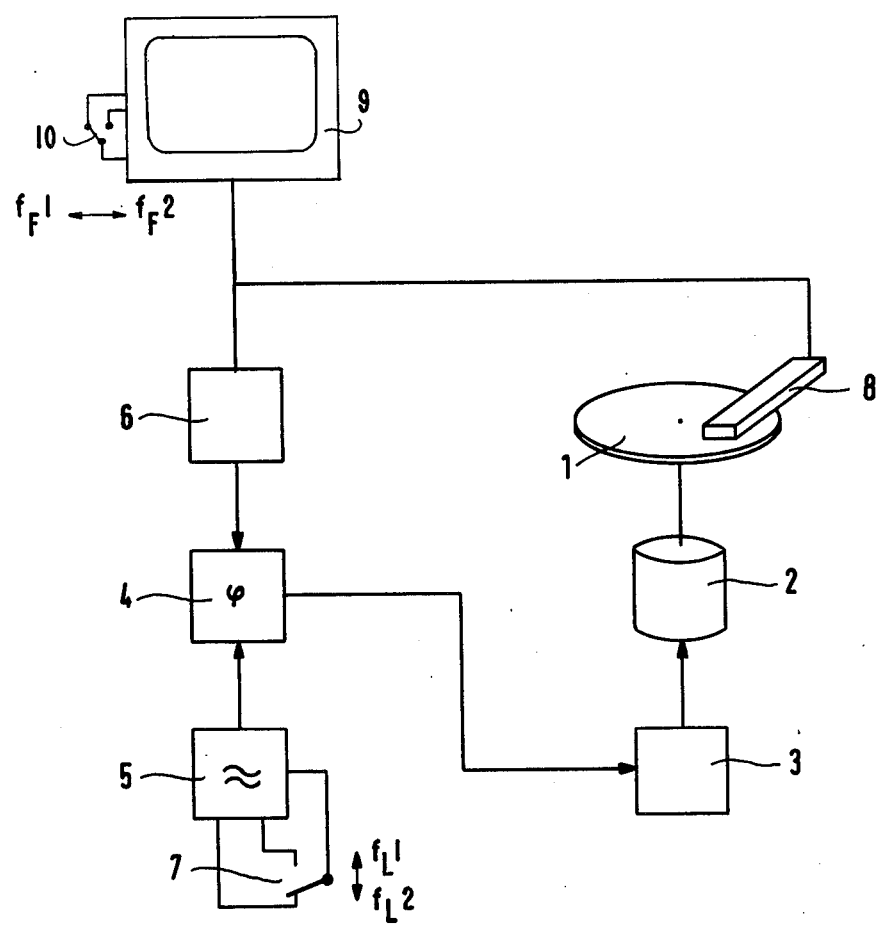

METHOD OF PLAYING BACK VIDEO RECORDS THROUGH TELEVISION RECEIVER OPERATING AT A DIFFERENT LINE STANDARD

The present invention relates to a method of playing back video records by means of a video record playback apparatus so as to reproduce a picture information recorded according to a first standard with a first picture field scanning frequency ($f_F1$) and a first line scanning frequency ($f_L1$) on a television set designed for reproducing picture information recorded according to a second standard with a second picture field scanning frequency ($f_F2$) and a second line scanning frequency ($f_L2$).

When the technical and marketing problems of the introduction of video record playback systems were first met, it was found necessary, owing to the fact that the standards of the United States of America (Standard M) and of Europe (Gerber Standard) differ as regards picture field frequency and line frequency, to produce two sets of video records respectively corresponding to the different television standards, each set providing the same picture information. Manufacture of two different kinds of disks for each record subject, however, is not only expensive for the manufacturer but also requires increased storage capacity in distribution facilities, and thus markedly affects the profitability of any such recording procedure.

An object of the present invention is to provide a method that enables a purchaser of a video record recorded according to the U.S. standard to play it back on a television receiver designed according to the European Television Standard.

SUMMARY OF THE INVENTION

Briefly, the vertical deflection circuit of the European television receiver is set to the picture field scanning frequency of the U.S. standard, and the playback speed of the video record playback apparatus is set to a value at which the reproduced picture lines will be reproduced at the line frequency of the European Television Standard.

During preliminary trials it was found that no modification of the design of the FM demodulator in the decoder of the receiver is necessary, although the FM modulation picked up from the video record in the method according to the present invention lies lower than the frequency level chosen for recording. The FM demodulators normally provided proved to be sufficiently broadbanded. The frequency shift of the FM modulation means a slight reduction in the amplitude of the luminance signal, which, however, according to the results of the preliminary trials, lies below the threshold of visibility. It is this discovery that makes possible the unexpectedly simple solution above set forth of problem that at first seemed to be so complicated as to defy a practical solution.

Furthermore, the method of the present invention appears to provide the only possibility of preventing delay lines in the television set from causing disturbing effects at color edges.

As experiments have verified, the coarser line structure resulting when the vertical deflection circuit of the European-type television set is adjusted to the picture frequency of the U.S. standard M has no disturbing effect. Furthermore, even interference due to the European mask has not been observable.

Moreover, by means of the method according to the present invention it is possible to avoid interference even for methods of recording in which the color subcarrier lies in the luminance channel and is filtered out, upon reproduction, by means of a delay line acting as a comb filter.

The comb filter of the European video viewer will be capable of operating as desired only if the speed of the record past the pick-up of the playback apparatus causes the lines to be reproduced at the line scanning frequency of the European Television Standard. That means that the playback must differ from the recording speed (or USA playback speed) by the factor of the ratio of the European to the American line scanning frequencies. Such a difference between the relative speed of record and recording head and the relative speed of record and pick-up head for faithful reproduction has heretofore been beyond the imagination of those skilled in the field of record players. They would have deemed it "unthinkable".

In the case of a video disk record the ratio of the line scanning frequencies must be applied as a factor to the rotational speed of the recording turntable to obtain the proper rotational speed of the playback turntable when the playback is to utilize a receiver operating at a line scanning frequency different from that used in recording. The invention is also applicable to tape records, in which case the playback speed that must be altered is the speed of the relative movement of record with respect to reading head that determines the line scanning frequency.

The invention is further described by way of illustrative example with reference to the annexed drawing in which the single FIGURE is a diagram of a circuit for controlling the speed of a playback turntable in accordance with the invention.

The video disk playback apparatus 1 is driven by a motor 2 the rotational speed of which is controlled by a control device 3, which may be any well-known kind of fine-control of motor speed suited to the particular motor.

The position of the control device 3 and hence also the speed of the motor 2 depends upon the output voltage of a phase detector 4, supplied at one input with timing pulses from an oscillator 5, at another input with reproduced line synch pulses separate from the picture signal by an amplitude separator 6. The amplitude separator 6 supplied with the reproduced composite video signal by a circuit located in the playback head of the pick-up device 8 of the playback apparatus. The pick-up device 8 also supplies the reproduced composite video signal to the television receiving set 9. The oscillator 5 can be switched by the switch 7 between two frequencies, i.e. between the line frequency of the U.S. Standard M of 15,734 HZ for playback through a U.S. standard receiver and the line frequency of the European Television Standard of 15,625 HZ for playback through a European standard receiver. The output of the phase detector provides a correction when needed for the motor speed control 3 to keep the reproduced line scanning frequency synchronized to the output oscillator 5.

Vertical deflection circuits adjustable to different picture field frequencies are known from multi-standard TV sets, as described for instance in German Pat. No. 1,050,806, German Pat. No. 1,156,842 Laid Open German Patent Application (OS) No. 1,153,061. The receiver 9, by which the signal obtained by the pick-up head 8 is displayed as a reproduced picture, if it is to be usable for playback of both U.S. standard recorded signals and European standard recorded signals, must have its vertical deflection circuits equipped with such a switching system so that it can scan the picture fields at the U.S. standard field frequency (30 HZ) and scan the picture lines at the European standard line frequency (15,625 HZ) in accordance with the invention.

Although the practice of the method of the invention has been illustrated by a single specific example, it will be evident that variations are possible within the inventive concept. For example the timing pulses can be obtained from the television set 9 instead of from the oscillator 5 if capability of operation of the playback system at the USA line scanning frequency is with American standard TV receivers is not needed and likewise the recorded line synchronizing signals can be obtained from an amplitude separator within the receiver 9 instead of by the amplitude separator 6 forming part of the turntable playback apparatus. In fact even the phase detector 4 could be built into the television receiver.

I claim:

1. A method of playing back a video record recorded at a first picture line scanning frequency ($f_L1$) and at a first picture field scanning frequency ($f_F1$) by means of a playback pick-up and a television receiver designed for operation at a second picture line scanning frequency ($f_L2$) and normally used for television reception at a second picture field scanning frequency ($f_F2$) comprising the steps of:

playing back a video record recorded at said first line and field scanning frequencies on a pick-up at a relative speed of the record with respect to the pick-up such as to reproduce the recorded picture lines at said second picture line scanning frequency ($f_L2$) and operating a television receiver with its video circuit input connected to the pick-up output with the horizontal deflection circuits of said receiver operating at said second picture line scanning frequency ($f_L2$) and with vertical deflection circuits of said receiver set for operation at said first picture field scanning frequency ($f_F1$).

2. A method as defined in claim 1 in which the step of playing back said record is performed by also performing the steps of:

comparing timing pulses provided to a phase detector at the frequency of said second picture line scanning frequency ($f_L2$) with picture signal line synchronizing pulses separated from a picture signal reproduced by said pick-up equipped turntable and also provided to said phase detector, and controlling a speed control for the movement of said record past said playback pick-up by the output of said detector, so as to synchronize said synchronizing pulses with said timing pulses.

* * * * *